United States Patent
Lin et al.

(10) Patent No.: US 7,845,842 B2
(45) Date of Patent: Dec. 7, 2010

(54) FRAME MEMBER OF A BACK LIGHTING MODULE

(75) Inventors: Ke-Feng Lin, Tu-Cheng (TW); Chi-Ming Tseng, Tu-Cheng (TW); Guan-Yi Liu, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 276 days.

(21) Appl. No.: 12/242,284

(22) Filed: Sep. 30, 2008

(65) Prior Publication Data

US 2010/0080020 A1 Apr. 1, 2010

(51) Int. Cl.
*F21V 15/01* (2006.01)

(52) U.S. Cl. ..................... 362/633; 362/97.1

(58) Field of Classification Search ......... 362/632–634, 362/97.1–97.4
See application file for complete search history.

(56) References Cited

U.S. PATENT DOCUMENTS

| 6,055,029 | A  | * | 4/2000 | Kurihara et al. | 362/633 |
| 2004/0141102 | A1 | * | 7/2004 | Lin | 349/58 |
| 2007/0030699 | A1 | * | 2/2007 | Tseng et al. | 362/632 |
| 2007/0171323 | A1 | * | 7/2007 | Lin | 349/58 |

* cited by examiner

*Primary Examiner*—David V Bruce
(74) *Attorney, Agent, or Firm*—Muncy, Geissler, Olds & Lowe, PLLC

(57) ABSTRACT

A frame member of a back lighting module includes a housing and a plastic frame. The housing defines a basic plate and a plurality of lateral plates bending from the basic plate. At least one lateral plate is warped to form a buckling portion with a concave-convex shape. The plastic frame is integrally bonded to the housing. The plastic frame has a plurality of sidewalls attached to insides of the corresponding lateral plates. At least one of the sidewalls has a mating portion integrally engaged with the buckling portion for fastening the housing and the plastic frame tightly.

3 Claims, 4 Drawing Sheets

FRAME MEMBER OF A BACK LIGHTING MODULE

BACKGROUND OF THE INVENTION

1. Field of the Invention

This present invention relates to a back lighting module, and more specifically to a frame member of a back lighting module.

2. The Related Art

A liquid crystal display (LCD) is used extensively in personal computers, mobile phones, PDAs, etc, because of the feature of light weight, small dimension and low power consumption. The LCD has a back lighting module. The back lighting module includes a frame member and an optical element mounted in the frame member. Generally, the frame member includes a housing and a plastic frame. The housing may be made by punching a metal sheet. The housing and the plastic frame are integrally bonded to each other in injection molding manner for reducing the size and enhancing the intensity of the frame member.

FIG. 1 is a schematic view showing structure of the frame member of the back lighting module. The frame member includes a housing 30 and a plastic frame 40 combined with the housing 30. The housing 30 defines a basic plate 31 and a lateral plate 32 extending upwards from an edge of the basic plate 31. The lateral plate 32 has a through hole 33. The plastic frame 40 is integrally bonded to the housing 30 by injection molding. However, in process of the plastic frame 40 molded with the housing 30, the holding time of the melting plastic flowing through the through hole 33 is longer than that of other places. As a result, the fluidity of the melting plastic comes down so as to affect the quality of the plastic frame 40 combined with the housing 30.

SUMMARY OF THE INVENTION

An object of the invention is to provide a frame member of a back lighting module having a structure which guarantees the tight engagement of a plastic and a housing without affecting the quality thereof. The frame member of the back lighting module includes the housing and the plastic frame. The housing defines a basic plate and a plurality of lateral plates bending from the basic plate. At least one lateral plate is warped to form a buckling portion with a concave-convex shape. The plastic frame is integrally bonded to the housing. The plastic frame has a plurality of sidewalls attached to insides of the corresponding lateral plates. At least one of the sidewalls has mating portion integrally engaged with the buckling portion for fastening the housing and the plastic frame tightly.

As described above, the mating portion is integrally engaged with the buckling portion, which is helpful for the plastic frame to be fixed to the housing firmly. Meanwhile, the lateral plate is warped to form the buckling portion of concave-convex shape, which does not affect the fluidity of the melting plastic in process of the plastic frame molded with the housing so as not to extend the holding time thereof and consequently, guarantees the tight engagement between the housing and the plastic frame without affecting the quality of the frame member.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE EMBODIMENTS

Figure 1:
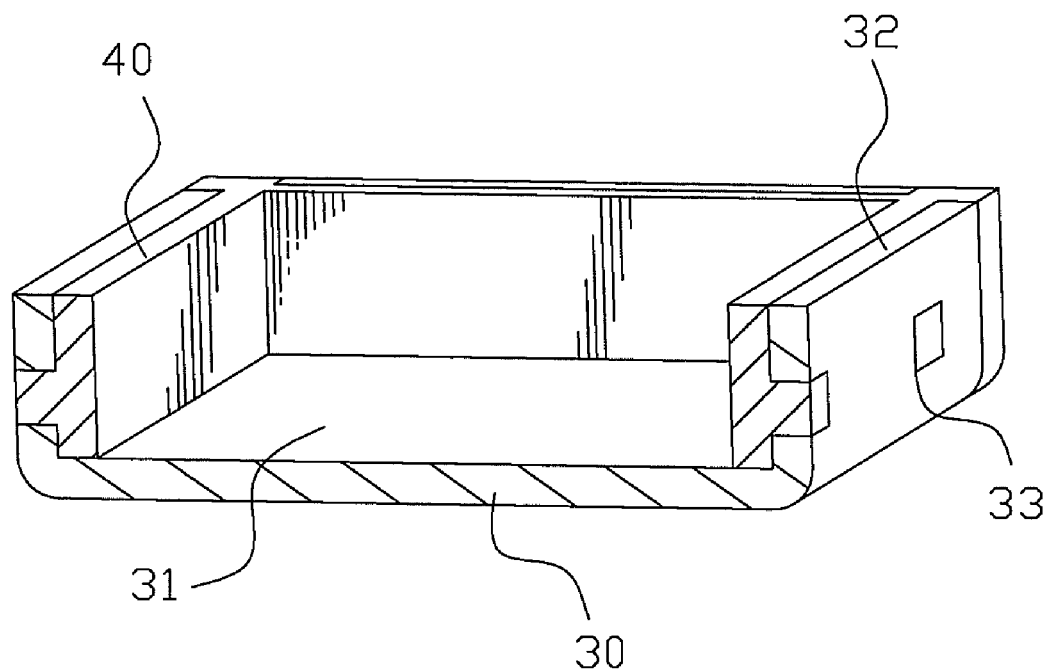
FIG. 1 is a cross-sectional view of a frame member of a back lighting module of the prior art.
Figure 2:
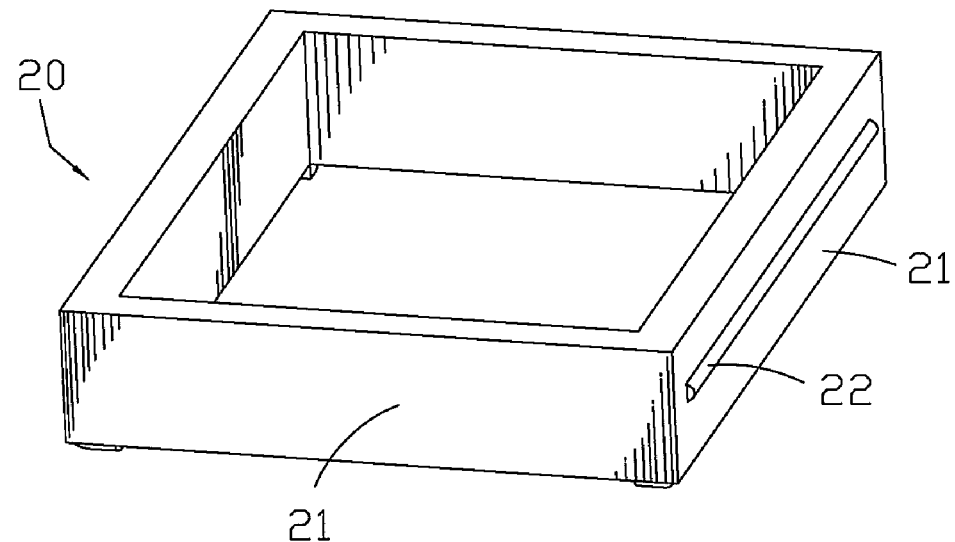
FIG. 2 is an exploded view of a frame member of a back lighting module of a first embodiment in accordance with the present invention.
Figure 2:
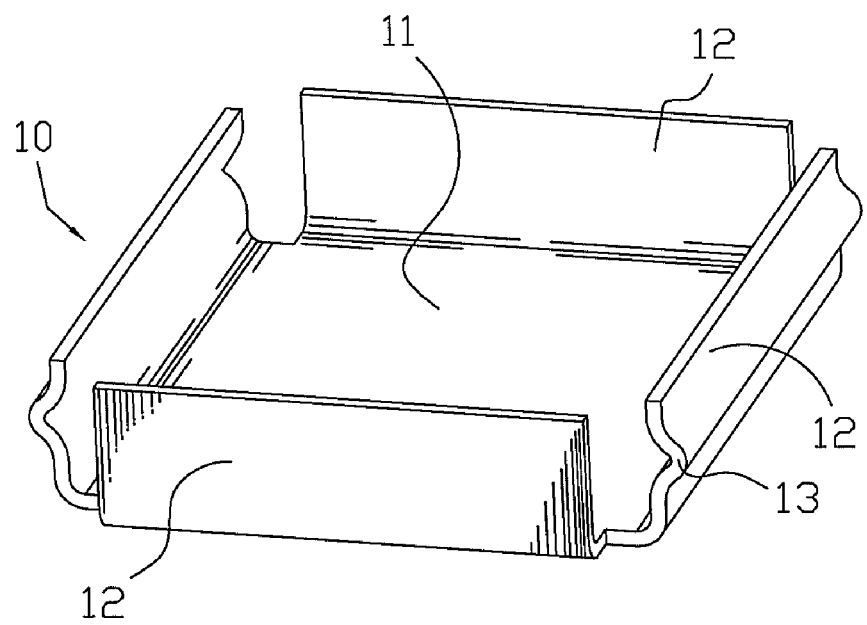
Figure 3:
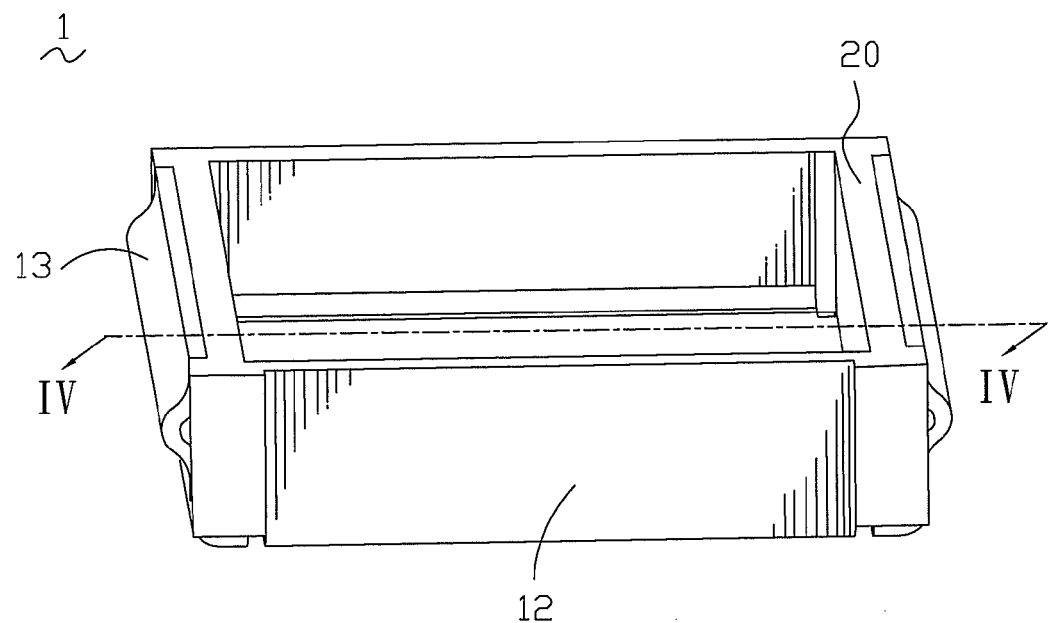
FIG. 3 is a perspective view of the frame member of a back lighting module shown in FIG. 2.

Referring to FIG. 2 and FIG. 3, a first embodiment of a frame member of a back lighting module 1 according to the present invention is shown. The frame member of the back lighting module 1 adapted for receiving an optical element (not shown) includes a housing 10 and a plastic frame 20 accommodated in the housing 10. The housing 10 defines a rectangular basic plate 11. Each edge of the basic plate 11 extends upwards to form a lateral plate 12. The lateral plates 12 are unattached to each other, with ends thereof spaced away from each other with a certain distance. At least one lateral plate 12 is curved outwards from the middle thereof to form a buckling portion 13. The buckling portion 13 is an outward convex shape. In this embodiment, there is a pair of lateral plates 12 facing each other having the buckling portions 13.

Figure 4:
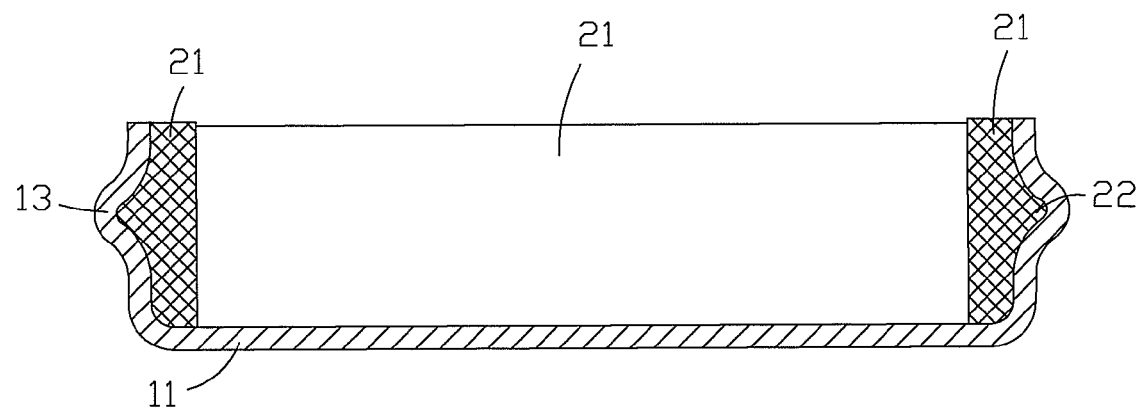
FIG. 4 is a cross-sectional view taken along IV-IV of FIG. 3.

Please refer to FIG. 3 and FIG. 4, the plastic frame 20 is integrally bonded to the housing 10 by injection molding. The plastic frame 20 is of rectangular shape and defines a sidewall 21. The sidewall 21 is disposed to be attached to an inner surface of the lateral side 12 to form a receiving recess for accommodating the optical element. The sidewall 21 forms a mating portion 22 corresponding to the buckling portion 13. The mating portion 22 is integrally engaged with buckling portion 13 for fixing the housing 10 and the plastic frame 20 tightly.

Figure 5:
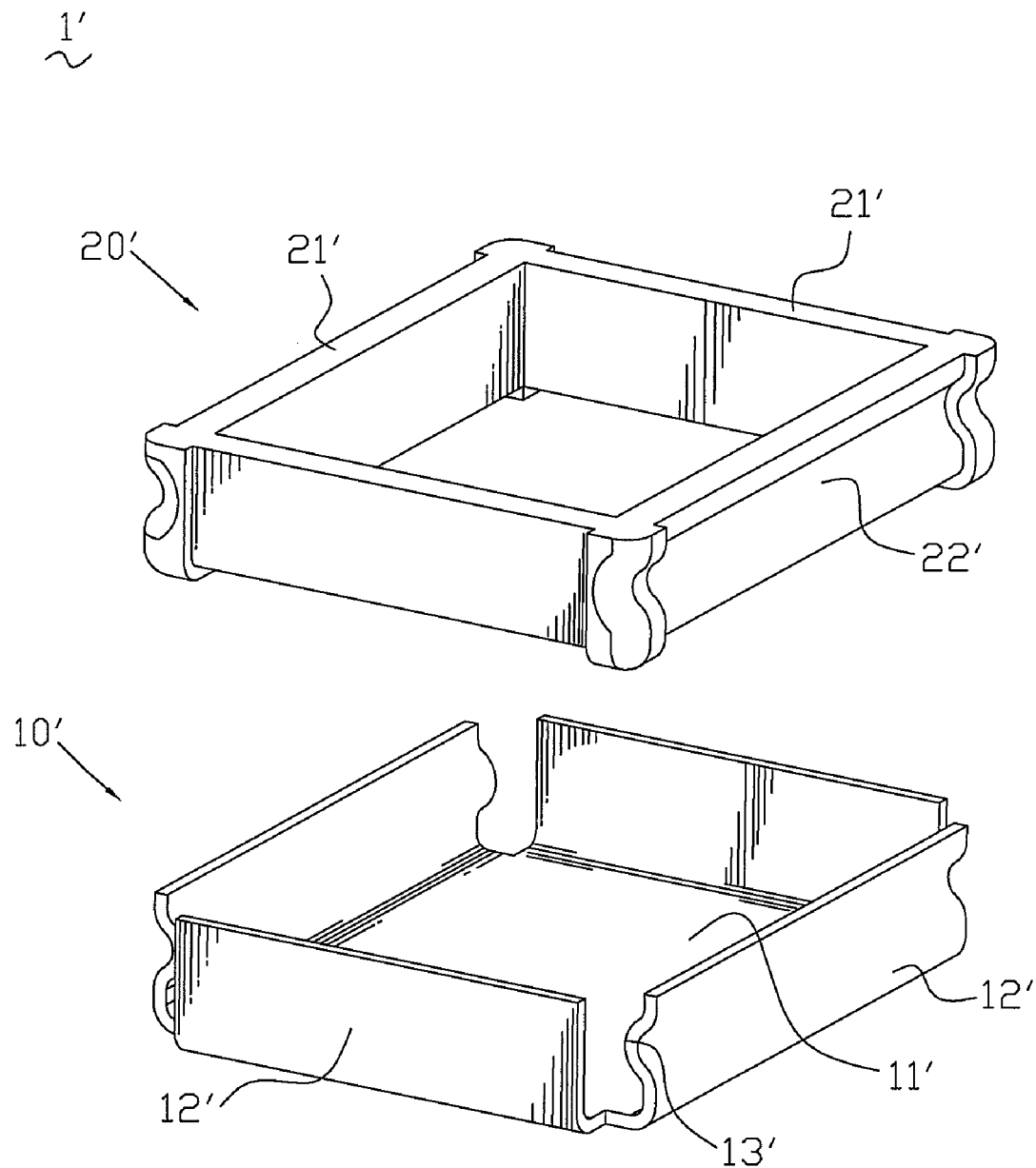
FIG. 5 is an exploded view of a frame member of a back lighting module of a second embodiment in accordance with the present invention.

With reference to FIG. 5, a frame member of a back lighting module 1' of a second embodiment according to the present invention is shown. The difference between the frame member 1 in the first embodiment and the frame member 1' in the second embodiment is the shape of the buckling portion 13' and the mating portion 22' corresponding to the buckling portion 13'. In this embodiment, the lateral plate 12' is curved inwards to form the buckling portion 13'. The buckling portion 13' is an inward concave shape. Accordingly, the sidewall 21' of the plastic frame 20' is integrally bonded with the lateral plate 12' to form the mating portion 22' corresponding to the buckling portion 13' to show an inward concave shape. The mating portion 22' is integrally engaged with the buckling portion 13' for fixing the plastic frame 20' and the housing 10' tightly.

It should be noted that the shape of the buckling portion of the housing can be changed for conforming to different demands and should not be limited. For example, the lateral plate can be curved repetitiously to form the buckling portion with not only an inward convex shape but also an outward convex shape. Accordingly, the mating portion corresponding to the buckling portion is shaped so that the buckling portion and the mating portion are integrally bonded to each other firmly.

As described above, the mating portion is integrally engaged with the buckling portion, which is helpful for the plastic frame to be fixed to the housing tightly. Meanwhile, the lateral plate is warped to form the buckling portion of concave-convex shape, which does not affect the fluidity of the melting plastic in process of the plastic frame molded with the housing so as not to extend the holding time thereof. Therefore, such structure can guarantee the tight engagement between the housing and the plastic frame without affecting the quality of the frame member.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A frame member of a back lighting module, comprising:
    a housing, the housing defining a basic plate and a plurality of lateral plates bending from the basic plate, at least one lateral plate being warped to form a buckling portion with a concave-convex shape; and
    a plastic frame integrally bonded to the housing, the plastic frame having a plurality of sidewalls attached to insides of the corresponding lateral plates, at least one of the sidewalls having a mating portion integrally engaged with the buckling portion for fastening the housing and the plastic frame tightly.

2. The frame member of a back lighting module as set forth in claim 1, wherein the lateral plate is curved outwards to form the buckling portion with a outward convex shape, the mating portion integrally engaged with the buckling portion shows an outward convex shape.

3. The frame member of a back lighting module as set forth in claim 1, wherein the lateral plate is curved inwards to form the buckling portion with an inward concave shape, the mating portion integrally engaged with the buckling portion shows an inward convex shape.

* * * * *